Figure 1:
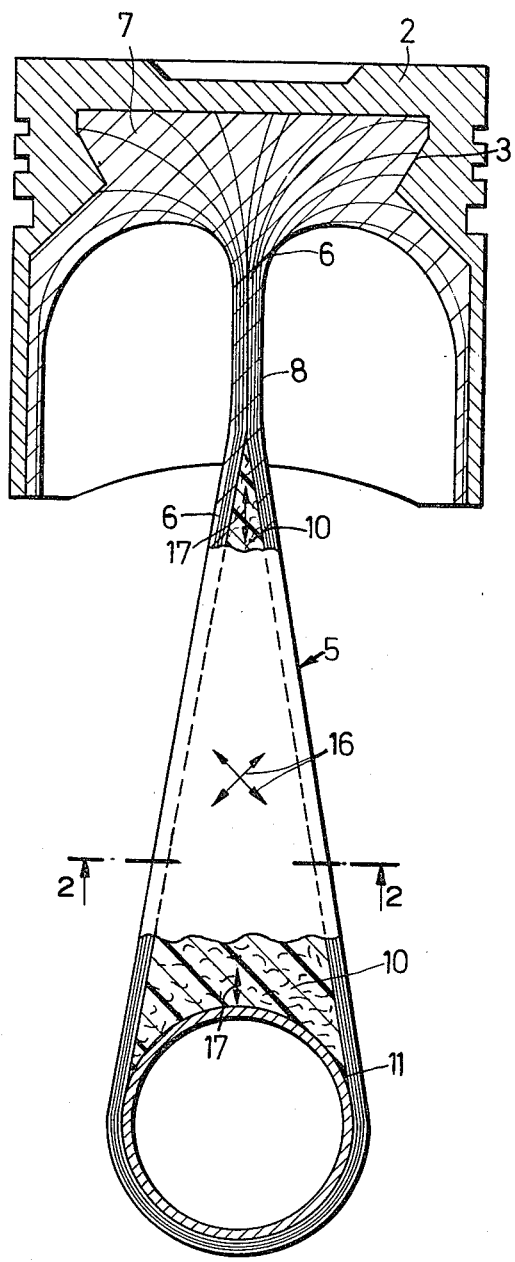

United States Patent [19]

Schulz

[11] 4,329,915
[45] May 18, 1982

[54] PISTON AND PISTON ROD

[75] Inventor: Ralf-Thilo Schulz, Putzbrunn, Fed. Rep. of Germany

[73] Assignee: Messerschmitt-Boelkow-Blohm GmbH, Munich, Fed. Rep. of Germany

[21] Appl. No.: 138,287

[22] Filed: Apr. 8, 1980

[30] Foreign Application Priority Data

Apr. 26, 1979 [DE] Fed. Rep. of Germany ....... 2916847

[51] Int. Cl.³ ............................................... F01B 9/02
[52] U.S. Cl. .......................................... 92/137; 92/84; 92/212; 92/DIG. 3; 403/265; 403/291
[58] Field of Search ................... 92/187, 212, 254, 84, 92/222, 137, DIG. 3; 403/220, 265, 267, 268, 291

[56] References Cited

U.S. PATENT DOCUMENTS 1,386,144  8/1921  Wall ..................................... 92/212
2,815,993 12/1957  Schweitzer ........................... 92/187
3,659,502  5/1972  Friedman .............................. 92/212

Primary Examiner—Abraham Hershkovitz
Attorney, Agent, or Firm—W. G. Fasse; D. F. Gould

[57] ABSTRACT

A piston rod is formed of fiber reinforced material so arranged that an elastic connecting zone is provided between the rod and the piston, thereby avoiding bolting one end of the piston rod to the piston. The cavity inside the piston has a dovetail recess. The fibers are anchored in the cavity and recess by embedding the fibers, which fan out in a uniform distribution from said elastic connecting zone, in a synthetic embedding material.

10 Claims, 2 Drawing Figures

PISTON AND PISTON ROD

BACKGROUND OF THE INVENTION

The invention relates to an apparatus comprising a piston and a piston rod connected to the piston for prime movers with a rotating crankshaft.

Prior art devices of this type comprise separate pistons and piston rods which are interconnected by piston bolts. Such a connection requires a continuous lubrication and is prone to require repairs. Further, the piston bolts and the piston rods are predominantly made of steel and steel castings. Thus, these components have a large mass causing increased bearing pressures.

OBJECTS OF THE INVENTION

In view of the above it is the aim of the invention to achieve the following objects singly or in combination:

to provide a piston, piston rod structure which is simpler than comparable arrangements of the prior art while simultaneously having a smaller mass and requiring less maintenance than prior art devices;

to employ fiber compound material for making a piston, piston rod structure, thereby avoiding the use of a so-called piston bolt; and to construct the piston, piston rod structure in such a manner that the vibrations of a prime mover, in which such piston, piston rod structures are installed, are substantially reduced.

SUMMARY OF THE INVENTION

According to the invention there is provided a piston, piston rod structure for prime movers including a rotating crankshaft which structure is characterized in that the piston rod which is made of fiber compound materials constitutes an integral component of the piston and is so constructed that any excursions between the piston and the crankshaft movement are elastically taken up in a flexible hinging point or zone of the piston rod without bolt connections between the piston head and the piston rod. Preferably, the piston rod or component is made of a strand of fibers impregnated with synthetic resin, whereby the fibers from a continuous loop which ends in the piston. At the opposite end the continuous loop encloses a crankshaft bearing bushing and a pressure take-up member also made of fiber reinforced synthetic material. The invention utilizes the advantageous characteristics of modern compound materials, especially fiber reinforced synthetic materials for producing an integral piston, piston rod structure in which the conventional hinge is replaced by a quasi joint between the piston proper and the adjacent end of the piston rod. Thus, it is possible to reduce the mass of the piston rod components which includes portions of the piston proper. Such mass reduction is substantial as compared to piston, piston rod structures of the prior art. The piston, piston rod structure according to the invention requires substantially no maintenance because the use of a piston bolt has been obviated. Another advantage of the invention resides in the fact that engines or prime movers equipped with the present piston, piston rod arrangement have noticeably reduced vibrations, and hence run rather more quietly than prior art prime movers.

BRIEF FIGURE DESCRIPTION

Figure 2:
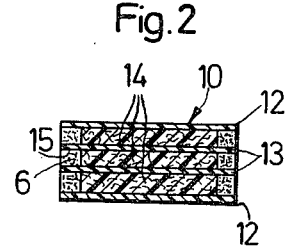

In order that the invention may be clearly understood, it will now be described, by way of example, with reference to the accompanying drawings, wherein:

FIG. 1 is a side view of a piston, piston rod arrangement according to the invention, mostly in section; and FIG. 2 is a sectional view through the piston rod along section line 2—2 in FIG. 1.

DETAILED DESCRIPTION OF A PREFERRED EXAMPLE EMBODIMENT AND OF THE BEST MODE OF THE INVENTION

As shown in FIG. 1 the present piston, piston rod arrangement comprises a piston 2 and a piston rod element 5 integrally connected to each other. The piston 2 has a conventional shape on the outside. However, on the inside it is provided with a dovetail type of recess 3 formed by turning or casting. This recess 3 receives the upper end of the piston rod 5 so that the piston and said upper end become an integral structure. The piston may be made in a conventional manner of metal, for example aluminum.

According to the teaching of the present invention for the construction of a fiber compound piston, piston rod arrangement with a minimal mass, the piston 2 is suitably made of carbon material which is reinforced by carbon fibers, whereby known winding techniques are employed and the wound blank is subsequently subjected to a pressing operation as well as to a finish turning operation.

A substantially continuous fiber strand 6 extends in the piston rod from the piston head around a bearing bushing 11 and back into the piston head. This strand in combination with a pressure body 10 transmits the pressure forces from the piston head into a crankshaft bearing not shown. In the head portion 7 of the piston rod element 5 the fiber strand 6 is sliced open whereby the fiber ends fan or flare out and are embedded in the internal space in the piston head in a synthetic resin, whereby an intimate, dovetail connection is accomplished due to the dovetailed recess 3. All the fibers of the strand or strands are concentrated in a flexible hinging zone or point 8 and then run apart again below the hinging zone 8, whereby both portions of the fiber strand or strands enclose the above mentioned pressure body 10 and the bearing shell or sleeve 11. As mentioned, the pressure member 10 cooperates with the fiber strand 6 in transmitting the pressure forces from the piston 2 to the bearing bushing 11 and thus into the crankshaft not shown.

The fiber strand 6 additionally transmits the tension forces while the pressure member or body 10 provides the piston rod element 5 with the necessary stiffness for taking up the bending loads and centrifugal forces which occur during the operation of the crankshaft. In order to enable the hinging zone 8 to take up the bending loads occurring in operation due to the excursions of the piston rod element 5 as a result of the rotation of the crankshaft, the fiber strand 6 must be made of a material having a high ultimate elongation resistance. For example, so-called E-glass fibers have been found to be suitable for this purpose. E-glass means Electro-glass with $E \sim 70000 N/mm^2$; $\sigma \sim 2200 N/mm^2$.

FIG. 2 shows the structure of the pressure body 10 comprising cover members 12, spacer rods 13 and narrower or shorter intermediate webs or lands 14. The elements 12, 13, and 14 are suitably made of fiber reinforced synthetic material and are bonded to one another by well known adhesives suitable for fiber reinforced synthetic materials. The webs 14 with the spacer rods 13 and the outer covers 12 form three grooves 15 in which the fiber strand 6, separated into three portions, is embedded by means of synthetic resin. For achieving an advantageous taking up of the forces and bending loads, the fibers in the covers 12 and in the spacer rods 13 cross one another under an angle of about 45° as indicated by the arrows 16 in FIG. 1. The fibers in the intermediate webs or lands 14 extend substantially in the direction of the arrows 17, namely, in the longitudinal direction of the piston rod 5.

Suitably, the fibers of the fiber strand 6 and the fibers of the pressure take-up member 10 are made of the same material. In any event, these fibers must be correlated in their characteristics to one another so that both components have the same or substantially the same heat expansion coefficient. It has been found to be suitable to produce all components of the piston rod of a highly heat resistant resin such as polyimide. However, where it should be possible to reduce the temperature of the engine cooling oil, it is possible to use less expensive resins, not necessarily high heat resistant resins, for example, epoxy resin.

The piston and piston rod arrangement shown in the drawings may be modified in its structure without departing from the present teaching. In any event, the present piston, piston rod arrangement is suitable for all types of prime movers employing a rotating crankshaft regardless whether they operate with the two stroke or four stroke system.

Although the invention has been described with reference to specific example embodiments, it will be appreciated, that it is intended, to cover all modifications and equivalents within the scope of the appended claims.

What is claimed is:

1. A piston head and piston rod structure for prime movers having a rotating crankshaft, comprising a loop formed of fiber strands embedded in synthetic resin, said fiber strands forming a bight for holding crankshaft bearing means in said bight at the free end of said piston rod, said fiber strands converging from both sides of said bight toward said piston head for forming a flexible piston rod hinging zone, said strands having ends flaring out of said flexible piston rod hinging zone, and anchoring means operatively securing said flaring strand ends in said piston head, whereby said flexible piston rod hinging zone provides a hinging joint for lateral excursions of the piston rod resulting from crankshaft rotations, said strands, anchoring means and piston head forming an integral structure, without a piston bolt.

2. The structure of claim 1, wherein said fiber strands comprise fibers having a high ultimate expansion $\epsilon > 1\%$.

3. The structure of claim 2, wherein said fibers are made of E-glass.

4. The structure of claim 1, wherein said pressure take-up means comprise channel means in which said fiber strands are received.

5. The structure of claim 4, wherein said pressure take-up means comprise outer cover means (12), intermediate lands (14), and spacer rods (13) forming said channel means in which said fiber strands are received.

6. The structure of claim 5, wherein said pressure take-up means are made of fiber reinforced materials whereby the fibers in said outer cover means and in said spacer rods cross one another at an angle of about 45° whereas the fibers of said intermediate lands extend substantially in parallel to the longitudinal axis of said piston rod.

7. The structure of claim 1, wherein said piston head is substantially hollow and provided with a dovetail type recess, and wherein said flaring out fiber strand ends above said flexible piston rod hinging zone are embedded in a distributed manner in a synthetic resin bonding material which bonds to the fibers and to the dovetail type recess in said piston head, whereby one end of said piston rod is anchored in said dovetail type recess of said piston head.

8. The structure of claim 1, wherein said piston head is made of metal.

9. The structure of claim 1, wherein said piston head is made of carbon fiber reinforced carbon material.

10. The structure of claim 1, wherein said bight of fiber strands has at least two legs, said structure further comprising pressure take-up means operatively held between said legs of fiber strands, said pressure take-up means resting with one end on said crankshaft bearing means and reaching with the other end to said flexible piston rod hinging zone.

* * * * *